(No Model.)
J. JACOBS.
YARD PROTECTOR.
No. 511,700. Patented Dec. 26, 1893.
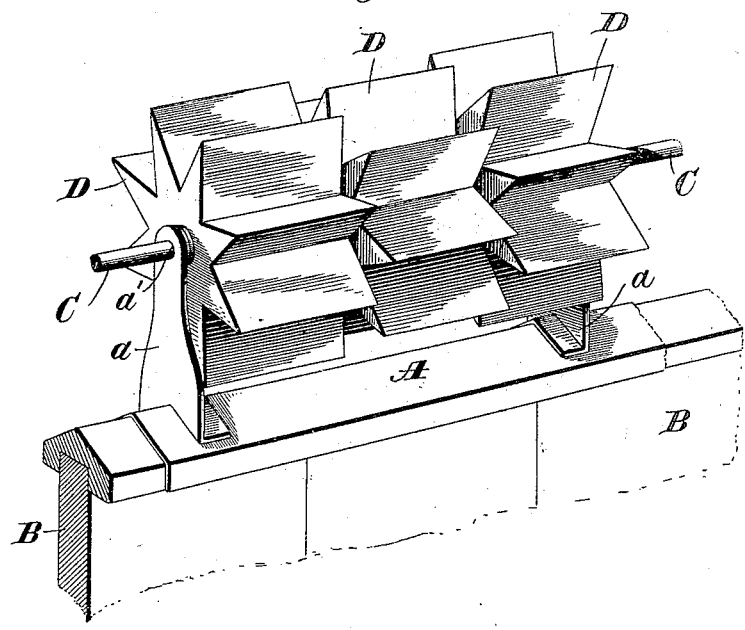
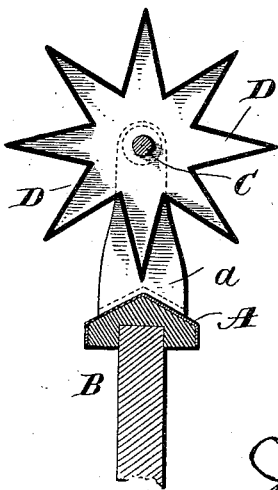
Witnesses:
Jas. E. Hutchinson.
Chas. J. Williamson.
Inventor.
Jacob Jacobs, by
Lindle & Russell, his attys

UNITED STATES PATENT OFFICE.

JACOB JACOBS, OF NEW YORK, N. Y.

YARD-PROTECTOR.

SPECIFICATION forming part of Letters Patent No. 511,700, dated December 26, 1893.

Application filed June 9, 1893. Serial No. 477,091. (No model.)

*To all whom it may concern:*

Be it known that I, JACOB JACOBS, a citizen of the United States, residing at New York, in the county of New York, and in the State of New York, have invented certain new and useful Improvements in Yard-Protectors; and I do hereby declare that the following is a full, clear, and exact description thereof, reference being had to the accompanying drawings, in which—

Figure 1 is a perspective view of my device in position upon a fence, and Fig. 2 is a cross section of the same.

Letters of like name and kind refer to like parts in each of the figures.

The object of my invention is to prevent cats and other like animals from passing over or standing upon the top of a fence and to this end my said invention consists in the construction of the device and its combination with a fence, substantially as and for the purpose hereinafter specified.

In the carrying of my invention into practice I employ a rail A which is, preferably, constructed from sheet metal and has such transverse form as to adapt it to fit upon and over the top of a fence B and form a cap for the same, as shown. At suitable intervals there are secured upon and project upward from the rail A a number of arms $a$ and $a$, each of which is provided within its upper end with an opening $a'$ that receives and contains a rod C which rod extends through the similar openings in the other arms and is in any suitable manner secured against longitudinal displacement.

Journaled upon the rod C are a number of rollers D and D which are, preferably, constructed from sheet metal and have, peripherally, the form of a star. Each of such rollers is capable of independent rotation so that an obstruction placed at any one point between the arms $a$ and $a$ would operate to prevent rotation of but one of said rollers instead of blocking all between such arms, as would be the case were but one roller employed. The rollers thus arranged furnish an effective means for preventing cats or other animals from securing a foothold upon or climbing over a fence, while the whole device is easily and cheaply constructed, is durable and does not render a fence unsightly.

Having thus described my invention, what I claim is—

1. As an improvement in mechanism for protecting a yard, a cap which is adapted to be secured upon and over the top of a fence, in combination with short rollers that are independently journaled upon and supported above the cap, substantially as and for the purpose specified.

2. As an improvement in mechanism for protecting a yard, a cap which is adapted to be secured upon and over the top of a fence, in combination with star-shaped rollers that are independently journaled upon and supported above the cap, substantially as and for the purpose shown.

3. As an improvement in mechanism for protecting yards, a cap which is adapted to be secured upon and over the top of a fence, in combination with arms attached to and rising from said cap, and supporting a rod, and several rollers having radial projections, journaled on said rod between the arms, and being independent of each other, substantially as and for the purpose set forth.

In testimony that I claim the foregoing I have hereunto set my hand this 1st day of May, 1893.

JACOB JACOBS.

Witnesses:
FRANKLIN LYNCH,
GEO. W. TICE.